United States Patent [19]

Inagaki et al.

[11] 4,184,804

[45] Jan. 22, 1980

[54] ROTARY ELECTRIC MACHINE HAVING A COOLING FAN

[75] Inventors: Mitsuo Inagaki; Hideaki Sasaya; Takashi Kurahashi, all of Okazaki, Japan

[73] Assignee: Nippon Soken, Inc., Nishio, Japan

[21] Appl. No.: 916,537

[22] Filed: Jun. 19, 1978

Related U.S. Application Data

[63] Continuation of Ser. No. 720,390, Sep. 3, 1976, abandoned.

[30] Foreign Application Priority Data

Oct. 10, 1975 [JP] Japan .................... 50-138925[U]
Jan. 20, 1976 [JP] Japan .................... 51-5492[U]

[51] Int. Cl.² ..................... F04D 17/00; H02K 9/06
[52] U.S. Cl. ..................... 415/213 R; 310/62
[58] Field of Search ............. 415/213 R, 219 C, 215, 415/213 B; 416/182, 185, 186; 417/362, 368, 371; 310/62, 58, 59

[56] References Cited

U.S. PATENT DOCUMENTS

| | | | |
|---|---|---|---|
| 2,835,320 | 5/1958 | McClure | 415/213 R UX |
| 3,139,034 | 6/1964 | Amirault et al. | 416/182 |
| 3,632,220 | 1/1972 | Lansinger et al. | 415/219 C X |
| 4,115,030 | 9/1978 | Inagaki et al. | 310/62 X |

FOREIGN PATENT DOCUMENTS

| | | | |
|---|---|---|---|
| 80999 | 9/1951 | Czechoslovakia | 310/62 |
| 707767 | 5/1941 | Fed. Rep. of Germany | 415/213 R |
| 746969 | 9/1944 | Fed. Rep. of Germany | 310/62 |
| 1138646 | 1/1957 | France | 417/371 |
| 174436 | 4/1935 | Switzerland | 310/62 |

*Primary Examiner*—Leonard E. Smith
*Attorney, Agent, or Firm*—Cushman, Darby & Cushman

[57] ABSTRACT

A rotary electric machine having a cooling fan comprises a housing of which a front wall has a plurality of air vents. A fan carried and driven by a rotary shaft of the rotary electric machine is arranged near the outer surface of the front end wall of the housing. The fan comprises a disk-shaped fan base plate securely attached to the rotary shaft and a plurality of blades formed by bending by about 90° the peripheral portions of the fan base plate having suitable notches and slots. The width of the blade is gradually reduced from its radially inner edge to its radially outer edge. The front end wall of the housing has a funnel-shaped surface corresponding to the edge of the blade.

3 Claims, 12 Drawing Figures

ROTARY ELECTRIC MACHINE HAVING A COOLING FAN

This is a continuation of application Ser. No. 720,390 filed Sept. 3, 1976, now abandoned.

BACKGROUND OF THE INVENTION

The present invention relates generally to a rotary electric machine and more particularly an improvement over the construction of a centrifugal cooling fan carried and driven by a rotary shaft of the rotary electric machine such as a motor, a generator or the like.

A conventional rotary electric machine for a vehicle comprises a housing the front end wall of which has a plurality of air vents and a fan arranged near the outer surface of the front end wall of the housing, for ventilating the inside of the housing to cool the heated parts therein. The fan comprises a disk-shaped fan base plate securely attached to the rotary shaft and a plurality of blades formed to an angle of bending by about 90° the peripheral portions of the fan base plate between notches or slots provided in the outer peripheral portion of the fan base plate. The width of the blade is constant.

According to the conventional rotary electric machine described above, an annular space through which the air radially flows is formed between the front end wall of the housing and the fan base plate. Therefore, a circular interstitial area of the annular space taken at any distance on a radii from the center axis of the rotary shaft becomes gradually increased from the radially inner portion to the radially outer portion. The cylindrically sectional area is proportional to its diameter. As a result, the velocity of the air radially passing through the blades becomes slower as the air outwardly advances. This means that the air flow is retarded as it passes through the passage between the adjacent blades. Since the air streams are not uniformly reduced in velocity while they are passing through the passage between the adjacent blades, there may result turbulent flow and also backward air flow through the blades. In the cooling fan of the type described above, further, since the fan base plate is, in general, in the form of a flat disk, the air run out of the housing is forced to abruptly change its direction at right angles to the axis of the rotary shaft when it impinges against the fan base plate, as a result, eddies are produced in the corner of the passage formed between the rotary shaft and the fan base plate. Since in the conventional cooling fan of type described above turbulent flow may occur anywhere so as to lower the cooling efficiency and to generate noise.

SUMMARY OF THE INVENTION

In view of the above, one of the objects of the present invention is to provide an improved cooling fan for use with a rotary electrical machine which may ensure the smooth and uniform flow of air passing through the passage between the housing and the blades and through the blades without causing turbulent flow so that the cooling efficiency may be remarkably increased and noise is suppressed to a minimum.

To obtain the above and other objects, according to the present invention, the width of each blade of a fan is gradually reduced from the radially outer edge to the radially outer edge. The front end wall of the housing faced with the blades has a funnel-shaped surface which is formed along the edge of each blade. That is, the front end wall of the housing adjacent to the fan, has a truncated conical surface coaxial with the rotary shaft and converging axially inward of the housing.

According to one embodiment of the present invention, an interconnecting portion between the fan base plate and the rotary shaft is smoothly curved from the axial direction to the radial direction, so that the air streaming through the housing is smoothly and uniformly directed along the interconnecting portion toward the blades without generating any eddies.

According to another embodiment of the present invention, a disk is attached to the outer end surface of the fan base plate so as to cover individual notches between the adjacent blades, thereby eliminating the problem of turbulent flow.

According to a further embodiment of the present invention, the outside diameter of the disk is made greater than the fan diameter and the conical end surface of the housing is correspondingly extended to the periphery of the disk in a radial direction, as a result, a more uniform and smoother discharge of the air through the fan can be ensured.

The above and other objects, features and advantages of the present invention will become more apparent from the following description of two preferred embodiments including some variations taken in conjunction with the accompanying drawings.

DESCRIPTION OF THE PREFERRED EMBODIMENTS

PRIOR ART, FIGS. 1 AND 2

Prior to the description of the preferred embodiments of the present invention, the prior art electric rotary machine will be described briefly in order to specifically point out the problems thereof.

Figure 1:
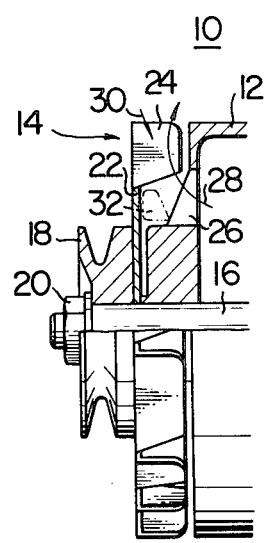
FIG. 1 is a fragmentary sectional view of a rotary electric machine incorporating a conventional cooling fan.

Referring to FIG. 1, a rotary electric machine generally designated by the reference numeral 10 comprises a housing 12 having a stator and a rotor and a cooling fan 14 for passing the air through the housing 12. One end of a rotary shaft 16 of the rotor which is rotatably supported in the housing 12 is extended out of the housing and is securely connected with a bolt 20 to the cooling fan 14 and a driving pulley 18. The fan 14 consists of a disk-shaped fan base plate 22 and a plurality of blades 24 each of which is formed by bending to an angle of about 90° the periphery portions of the fan base plate 22 between suitable notches and slots provided in the peripheral portion of the fan base plates 22. The blades 24 are symmetrically arranged to the rotary shaft. During the rotation of the fan 14, the air within the housing 12 is discharged out of the housing 12 through a plurality of air vents 26 formed through the front end wall of the housing 12 as indicated by the arrow 28.

Figure 2:
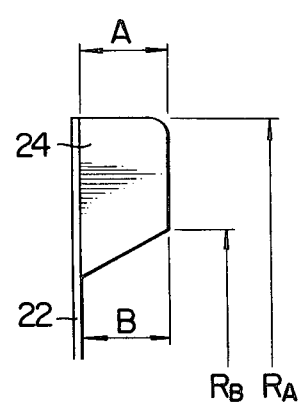
FIG. 2 is a view used for the explanation of the profile of the blade of the cooling fan.

The profile of the blade 24 is shown in FIG. 2. The width A at the radially outer edge of the blade 24 is equal to the width B at the radially inner edge, and the front end wall of the housing 12 is perpendicular to the axis of the rotary shaft 16. Therefore, the outlet area of an annular space within which blades 24 are revolved is greater than the inlet area by $R_A/R_B$, where $R_A$=radius of the outer periphery of the annular space and $R_B$=radius of inner periphery thereof. As a result, the air passed through the blades 24, tends to flow backwardly or radially inwardly as indicated by the arrow 30, and turbulence flow occurs in the space indicated by the broken lines 32.

In the rotary electric machine 10 of FIG. 1, the stator housing 12 has an annular front end wall provided with at least one air-ventilating passageway opening 26 generally axially therethrough radially offset somewhat from centrally of said annular front end wall. This annular front end wall is coaxially provided with a generally radially extending annular front wall surface extending radially beyond the passageway 26 and defining one axial extreme of a gap means for channeling ventilating air generally radially outwards once such air has issued from within said housing 12.

The machine 10 further includes a fan 14 mounted on a rotor shaft 16 mounted coaxially relative to said housing annular front end wall for rotation in generally confronting relation with said housing annular front end wall, said fan including a generally disk-shaped base plate 22 having an axially rear surface with a first, radially inner coaxially annular portion and a second, radially outer coaxially annular portion. The fan base plate 22 rear surface confronts said housing front end wall with axial spacing therebetween and defining the opposite axial extreme of said gap means for channeling ventilating air generally radially outwards once such air has issued from within said housing via said at least one air-ventilating passageway 26. The fan 14 further includes a plurality of fan blades 24 based in a coaxial ring on said fan base plate rear surface second, radially outer coaxially annular portion. Each such fan blade 24 is at least generally planar, extends at an angle to radially of said base plate and extends at least generally axially towards said housing front wall annular front surface within the radial extent of said housing front end wall annular front surface. Each fan blade 24 has a radially outer edge, a radially inner edge, and an axially rear edge which extends between said radially inner and outer edges. The fan blade 24 axially rear edges lie at least generally parallel to said housing front end wall annular front surface and in axially spaced confronting relation therewith, so that as said fan is rotated upon said rotary shaft air is drawn out of said housing through said at least one air-ventilating passageway 26, and is vented via said gap between said housing front end wall annular front wall surface and said fan base plate rear surface.

FIRST EMBODIMENT, FIGS. 3, 4, 5 AND 6

Figure 5:
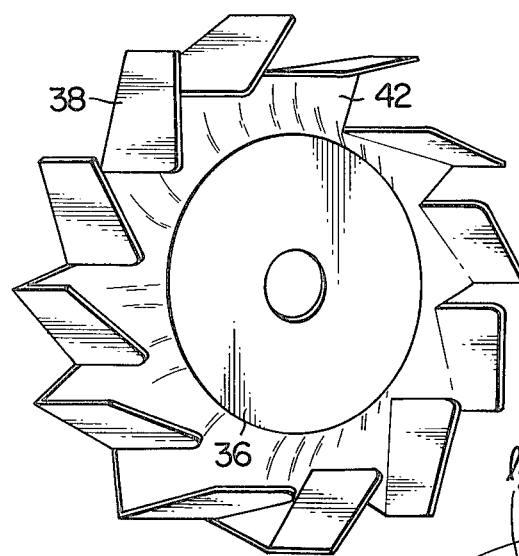
FIG. 5 is a perspective view of the fan shown in FIG. 3.
Figure 4A:
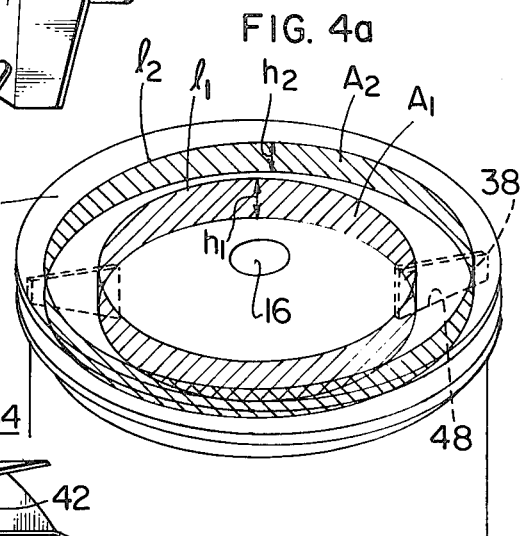
FIG. 4a is a fragmentary diagrammatic view illustrating the term "circular interstitial area" used herein.

A cooling fan generally indicated by the reference numeral 34 consists of a disk-shaped metallic fan base plate 36 and a plurality of blades 38 formed by bending to angle of about 90° the peripheral portions of the plate 36 between suitable notches and slots provided in the peripheral portions of the plate 36. The blades 38 are symmetrically arranged to the rotary shaft. The plate 36 has a deflector section 42 smoothly curved from an axial direction to a radial direction as best shown in FIGS. 3 and 5 so that the air discharged out of a housing 40 incorporating therein a rotary shaft 16, a rotor 16a mounted on the shaft 16 and a stator 40a may flow uniformly and smoothly along the deflector section 42 toward the blades 38.

Figure 4:
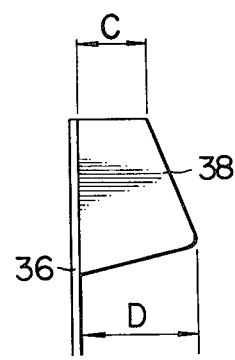
FIG. 4 is a view used for the explanation of the profile of the blade of the fan shown in FIG. 3.

The profile of the blade 38 is best shown in FIG. 4. Comparing with to the prior art fan shown in FIG. 2, the width C at the radially outer edge of the blade 33 is made smaller than the width D at the radially inner edge thereof, and the width of the blade 38 is gradually reduced from the radially inner edge to the outer edge.

The rotary shaft 16 is rotatably supported by the housing 40, and the front end wall of the housing 40 adjacent to the fan 34 has a plurality of air vents 46 through which the inside and the outside of the housing are communicated with each other. The outer surface 48 of the front end wall is axially tapered so as to be parallel with the rear edge of the blade 38 as best shown in FIG. 3. An annular projection 50 extends from the radially outer edge of the axially tapered or inclined end surface 48. The front surface of an annular projection 50 may preferably be coplanar with the outer surface 48.

Figure 3:
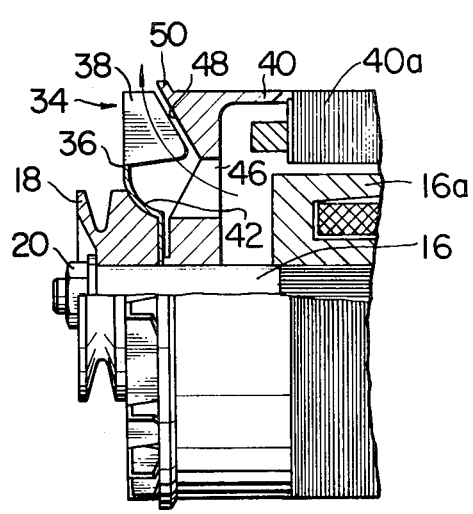
FIG. 3 is a fragmentary sectional view of rotary electric machine incorporating a cooling fan of a first embodiment of the present invention.

Upon rotation of the fan 34, the air discharged from the interior of the housing 40 through the air vents 46 flows uniformly and smoothly along the deflector section 42 and is discharged to the atmosphere through the blades 38 to be discharged into the surrounding atmosphere as indicated by the arrow in FIG. 3.

The distance between the fan base plate 36 and the outer surface 48 of the front end wall is gradually reduced radially outwardly so as to define a passage a circular interstitial area of which taken at any distance on a radii from the center axis of the rotary shaft 16 remains constant, thereby there occurs no turbulent flow and there is no backward air flow or radially inward flow between the blades 38. As a result, the cooling efficiency is remarkably increased and the noise problem is considerably suppressed. Since the air discharged out of the housing 40 flows smoothly along the deflector section 42, the cooling efficiency is further increased and noise is further suppressed.

Figure 6:
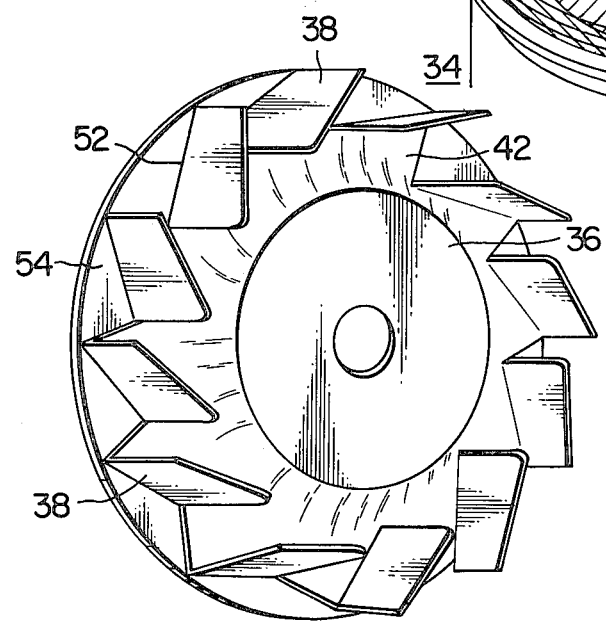
FIG. 6 is a view similar to FIG. 5 but illustrating a variation of the first embodiment.

In the first embodiment, the fan 34 is formed of a sheet of metal by drawing and bending, but as shown in FIG. 6, a disk 54 made of metal may be attached to the plate 36 coaxially thereof at the front side of the plate 36 remote from the blades 38 by spot welding or the like to close the axial passage 52 between the adjacent blades 38 so that the axial flow of the air through the blades 38 may be prevented. The cooling efficiency may be further increased. In the variation shown in FIG. 6, the diameter of the disk 54 is substantially equal to the diameter of the fan.

SECOND EMBODIMENT, FIGS. 7 THROUGH 11

Figure 7:
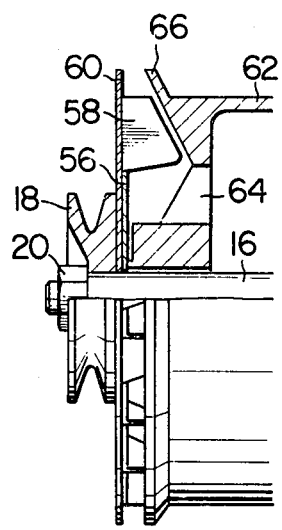
FIG. 7 is a fragmentary sectional view of a rotary electric machine incorporating a cooling fan of a second embodiment of the present invention.
Figure 8:
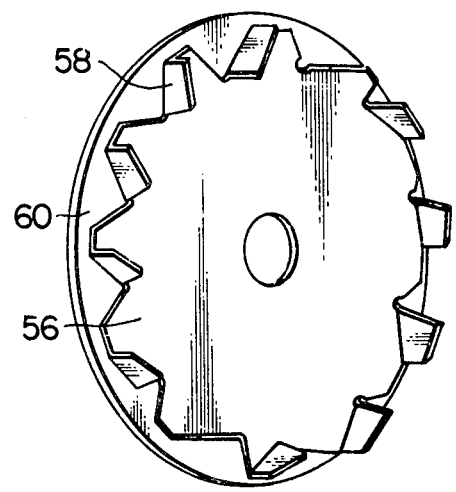
FIG. 8 is a fragmentary perspective view of the fan shown in FIG. 7.

The second embodiment shown in FIGS. 7 and 8 is substantially similar in construction to the first embodiment shown in FIGS. 3 through 6 except that the deflector section 42 is eliminated and the outer diameter of the disk 60 is larger than that of the fan.

Upon rotation of the cooling fan, the air is introduced into the housing 62 through air vents (not shown) formed in the rear end wall thereof remote from the fan, and is discharged out of the air vents 64 formed in the front end wall adjacent to the cooling fan after having cooled the heated parts in the housing 62 and is discharged by the centrifugal action of the fan into the surrounding atmosphere. As with the case of the first embodiment, the width of the blade 58 is gradually radially outwardly reduced from the radially inner edge thereof to the radially outer edge thereof. The distance between the plate 56 and the front end surface of the housing 62 is gradually reduced radially outwardly so as to define a passage a circular interstitial sectional area of which taken at any distance on a radii from the center axis of the rotary shaft 16 remains constant. As a result, the air flows smoothly and uniformly through the passage between the adjacent blades 58 without being retarded. In addition, the annular space defined between the disk 60 outside the radially outer edges of the blades 58 and the annular projection 66 of the housing 62 functions as a diffuser having no blade so that the air may be smoothly discharged at high efficiency. As a result, high cooling efficiency and the low noise may be ensured.

In the second embodiment, the fan is also fabricated from a sheet of metal by drawing and bending, and the disk 60 is attached to the fan by spot welding. Alternatively, the disk 60 may be securely attached to the fan with rivets, screws or the like. Moreover, the disk 60 may be in the form of a ring, or both the fan wheel and the disk 60 may be molded from plastic as a unitary one-piece part.

Figure 9:
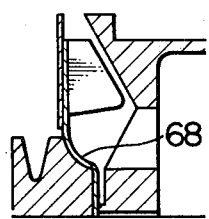
FIGS. 9, 10 and 11 are fragmentary sectional views, on enlarged scale, used for the explanation of three variations of the second embodiment, respectively.

When the blades 58 and the plate 56 are interconnected by the deflector section 68 which is substantially similar to that of the first embodiment as shown in FIG. 9, a more uniform and smoother air flow may be ensured. This has been confirmed by the experiments conducted by the inventor.

Figure 10:
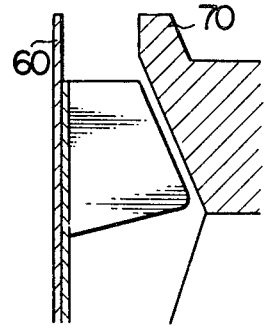
Figure 11:
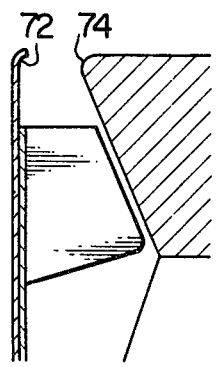

As shown in FIG. 10, the end face of the annular projection 70 may be made straight in opposed and parallel relation with the disk 60 outside the radially outer edges of the blades 58. Or, as an alternative, as shown in FIG. 11, the peripheral edge 72 of the disk 60 may be curved rearwardly while the tapered end face in opposed relation with the tapered rear edges of the blades 58 may be terminated into the curved or rounded peripheral edge 74.

So far the air has been described as being discharged radially, but it will be understood that it may be discharged in any direction as needs demand.

With regard to the embodiment of FIGS. 7–11, the following differences from the PRIOR ART construction of FIG. 1 should be noted:

(a) Each fan blade 58 gradually decreases in width, measured axially of the rotary electric machine, as each blade extends radially outwardly, so that as seen in side elevation, the radially outer edge of each fan blade is narrower than the radially inner edge thereof, and the axially rear edge thereof is disposed obliquely.

(b) Each fan blade 58 radially outer edge as seen in side elevation of such fan blade, is of somewhat smaller diameter than said fan base plate 56, so that an annular rim region 60 of said base plate is defined, which rim region lies axially outwardly of the ring of fan blades 58 to the outer peripheral extent of said base plate.

(c) The housing front end wall annular front wall surface second, radially outer coaxially annular portion radially coextends with both said ring of fan blades and said annular rim region 60 of said fan base plate 58, thereby defining with said rim region 60 a diffuser between 60 and 66 for ventilating air issuing radially outwardly of said gap.

(d) The annular front wall surface is of concave, at least generally conical curvature.

(e) The product of the width of said gap at any selected radius within the radial extent of said ring of fan blades 58 and the circumference of said gap at said radius is substantially constant for all radii within said radial extent of said ring of fan blades.

As to the construction shown in FIG. 9, one should notice as a difference that the fan base plate axially rear surface first, radially inner coaxially annular portion, where it lies in confronting relation with said at least one air-ventilating passageway of said housing is concavely curved towards said housing front end wall at 68, from being more radially facing towards the radially inner extent thereof towards being more axially facing towards the radially outer extent thereof, so that said fan base plate axially rear surface first, radially inner coaxially annular portion smoothly changes the direction of air flow to the radial direction from the axial direction as air passes from said at least one air ventilating passageway 26 to said gap.

As to the construction shown in FIG. 11, one should notice as a difference that the base plate in said rim region thereof at 72 bends axially towards said housing front end wall annular front surface near the outer periphery of each.

What is claimed is:

1. In a rotary electric machine having means for cooling said machine,
which includes:
a stator housing having an annular front end wall provided with at least one air-ventilating passageway opening generally axially therethrough radially offset somewhat from centrally of said annular front end wall, said annular front end wall coaxially having a generally radially extending annular front wall surface extending radially beyond said at least one air-ventilating passageway and defining one axial extreme of a gap means for channeling ventilating air generally radially outwards once such air has issued from within said housing via said at least one air-ventilating passageway; and
which further includes a fan mounted on a rotor shaft mounted coaxially relative to said housing annular front end wall for rotation in generally confronting relation with said housing annular front end wall, said fan including a generally disk-shaped base plate having an axially rear surface with a first, radially inner coaxially annular portion and a second, radially outer coaxially annular portion, said fan base plate rear surface confronting said housing front end wall with axial spacing therebetween and defining another axial extreme of said gap means for channeling ventilating air generally radially outwards once such air has issued from within said housing via said at least one air-ventilating passageway; said fan further including a plurality of fan blades based in a coaxial ring on said fan base plate rear surface second, radially outer coaxially annular portion; each such fan blade being at least generally planar, extending at an angle to radially of said base plate and at least generally axially towards said housing front wall annular front surface within the radial extent of said housing front end wall annular front surface; each fan blade having a radially outer edge, a radially inner edge, and an axially rear edge which extends between said radially inner and outer edges; the fan blade axially rear edges lying at least generally parallel to said housing front end wall annular front surface and in axially spaced confronting relation therewith, so that as said fan is rotated upon said rotary shaft air is drawn out of said housing through said at least one air-ventilating passageway, and is vented via said gap between said housing front end wall annular front wall surface and said fan base plate rear surface, the improvement wherein:

(a) each fan blade gradually decreases in width, measured axially of the rotary electric machine, as each blade extends radially outwardly, so that as seen in side elevation, the radially outer edge of each fan blade is narrower than the radially inner edge thereof, and the axially rear edge thereof is disposed obliquely;

(b) each fan blade radially outer edge as seen in the side elevation of such fan blade, is of somewhat smaller diameter than said fan base plate, so that an annular rim region of said base plate is defined, which rim region lies axially outwardly of said ring of fan blades to the outer peripheral extent of said base plate;

(c) said housing front end wall annular front wall surface second, radially outer coaxially annular portion radially coextends with both said ring of fan blades and said annular rim region of said fan base plate, thereby defining with said rim region a diffuser for ventilating air issuing radially outwardly of said gap;

(d) said annular front wall surface being of concave at least generally conical curvature; and (e) the product of the width of said gap at any selected radius within the radial extent of said ring of fan blades and the circumference of said gap at said radius being substantially constant for all radii within said radial extent of said ring of fan blades.

2. The rotary electric machine of claim 1, wherein:
said base plate in said rim region thereof bends axially towards said housing front end wall annular front surface near the outer periphery of each.

3. The rotary electric machine of claim 1, wherein:
said fan base plate axially rear surface first, radially inner coaxially annular portion lies in confronting relation with said at least one air-ventilating passageway of said housing and is concavely curved towards said housing front end wall, from being more radially facing towards the radially inner extent thereof towards being more axially facing towards the radially outer extent thereof, so that said fan base plate axially rear surface first, radially inner coaxially annular portion smoothly changes the direction of air flow to the radial direction from the axial direction as air passes from said at least one air ventilating passageway to said gap.

* * * * *